(12) United States Patent
Berkay et al.

(10) Patent No.: US 8,411,076 B2
(45) Date of Patent: Apr. 2, 2013

(54) DISPLAY DEVICE

(75) Inventors: Cengiz Berkay, Istanbul (TR); Osman Osman, Istanbul (TR)

(73) Assignee: Arcelik Anonim Sirketi, Istanbul (TR)

( * ) Notice: Subject to any disclaimer, the term of this patent is extended or adjusted under 35 U.S.C. 154(b) by 299 days.

(21) Appl. No.: 12/996,377

(22) PCT Filed: Jun. 1, 2009

(86) PCT No.: PCT/IB2009/052294
§ 371 (c)(1),
(2), (4) Date: Dec. 3, 2010

(87) PCT Pub. No.: WO2009/147609
PCT Pub. Date: Dec. 10, 2009

(65) Prior Publication Data
US 2011/0080338 A1  Apr. 7, 2011

(30) Foreign Application Priority Data

Jun. 5, 2008 (TR) .............................. a 2008 04101

(51) Int. Cl.
*G09G 5/00* (2006.01)
(52) U.S. Cl. .......................... 345/211; 713/300; 348/730

(58) Field of Classification Search .................. 345/158, 345/211; 713/300, 320, 340; 348/730, 734; 363/13, 15, 34
See application file for complete search history.

(56) References Cited

U.S. PATENT DOCUMENTS

| | | | | |
|---|---|---|---|---|
| 5,991,883 A | * | 11/1999 | Atkinson | ...................... 713/300 |
| 6,330,175 B2 | | 12/2001 | Shirato et al. | |
| 8,120,705 B2 | * | 2/2012 | Onomatsu | |

FOREIGN PATENT DOCUMENTS

| EP | 0610700 A | 8/1994 |
|---|---|---|
| WO | WO 2006011032 A | 2/2006 |

OTHER PUBLICATIONS

International Search Report, mailing date Nov. 17, 2009, for corresponding International Application No. PCT/IB2009/052294.

* cited by examiner

*Primary Examiner* — Regina Liang
(74) *Attorney, Agent, or Firm* — Venable, Campillo, Logan & Meaney, P.C.

(57) ABSTRACT

The present invention relates to a display device comprising a battery (6) used as the power supply in standby mode and a standby mode microcontroller (3) which controls the elements used in standby mode by measuring the current drawn from the battery (6) and the battery voltage (Vbat), and in which device, the power drawn from the mains supply in standby mode is zero.

17 Claims, 1 Drawing Sheet

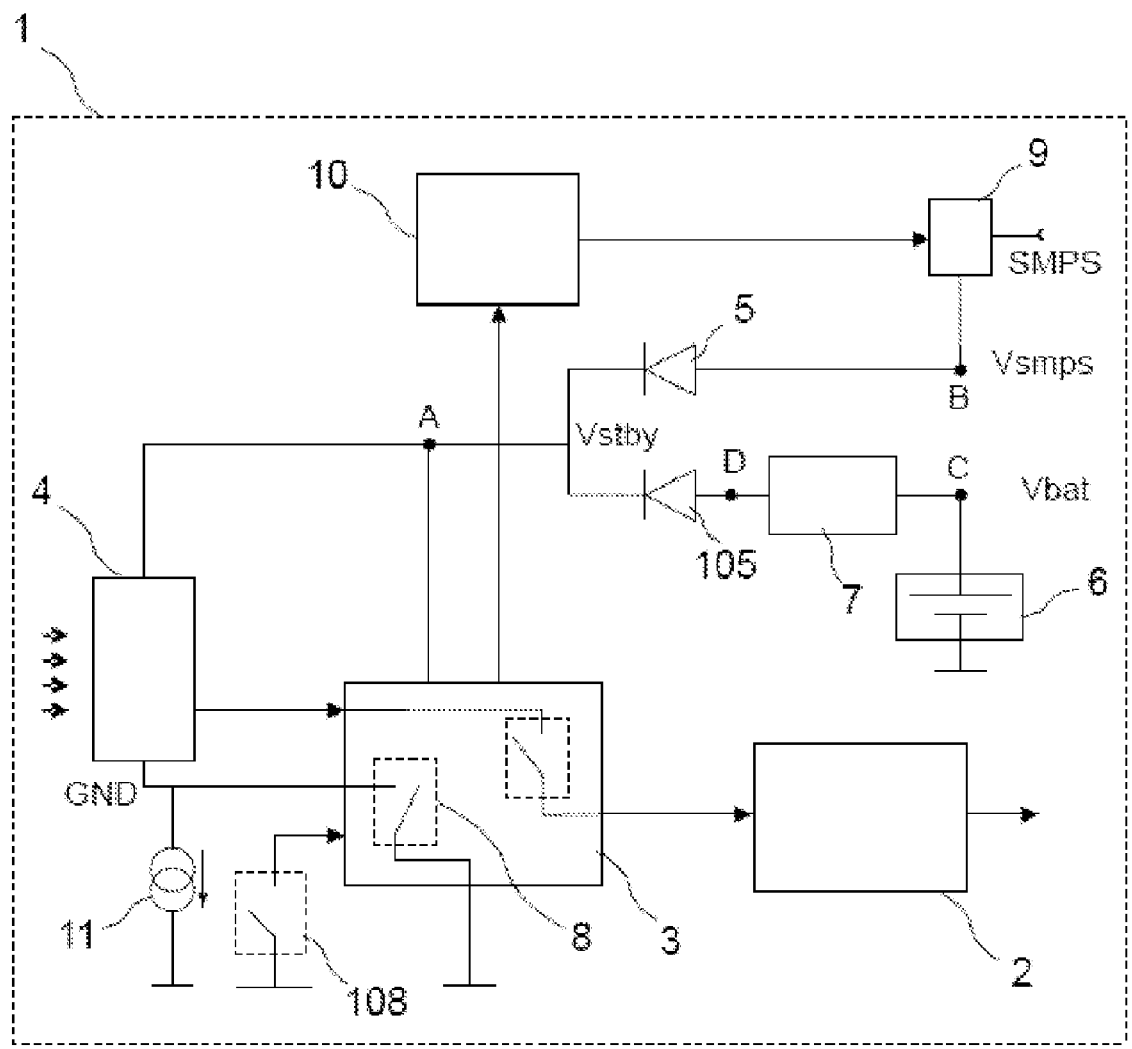

US 8,411,076 B2

DISPLAY DEVICE

CROSS-REFERENCE TO RELATED APPLICATIONS

This application is a U.S. National Phase application, under 35 U.S.C. §371, of International Application no. PCT/IB2009/052294, with an international filing date of Jun. 1, 2009 and claims benefit of Turkish Application no. 2008/04101 filed on Jun. 5, 2008, and which are hereby incorporated by reference for all purposes.

FIELD OF THE INVENTION

The present invention relates to a display device whose power consumption in standby mode is reduced.

PRIOR ART

Power saving is achieved in new generation electronic devices by using switch-mode power supply (SPMS) in cases where the device is not used actively. The device operates in normal mode when it is turned on. In this mode, power required for the device to carry out all of its operations is supplied from the mains supply. In standby mode, the main supply is cut off and only the basic units (e.g. microprocessor) which are adequate to restart the device are supplied with the least possible power. However these devices constantly draw power, although in small quantity, from the mains supply also in standby mode and consume energy. Furthermore, using AC-DC converters also in standby mode supply circuits, which provide the required power in standby mode, increases power consumption by decreasing efficiency of the supply circuit.

The United States patent document U.S. Pat. No. 6,330,175, in the state of the art, describes an application for reducing the power consumed in standby mode. In the said invention, when it is switched to the standby mode, a unit on which energy is stored in advance is used for supplying energy to the microprocessor which continues to operate in the said mode. Thus power consumption in standby mode is reduced.

SUMMARY OF THE INVENTION

The objective of the present invention is to provide a display device whose power consumption in standby mode is reduced to zero.

The display device developed to fulfill the objective of the present invention and disclosed in the first claim and the dependent claims thereof does not draw current from the mains supply in standby mode, but can be turned on by the remote control when desired. The low power needed for this purpose is provided by a battery disposed in the device. The voltage on the battery is controlled in order to minimize the current that is drawn from the battery in standby mode and thus to maximize the life of the battery. In the case that the voltage on the battery decreases and the battery is about to go flat, the user is warned and the required low energy is supplied from the mains supply. Thus, when the device is in standby mode power is not drawn from the mains supply, it is ensured that the battery energy is used in an efficient manner and that the device continues to operate without any problem even in the case that the voltage decreases due to end of the battery life.

DETAILED DESCRIPTION OF THE INVENTION

The display device developed to fulfill the objective of the present invention is illustrated in the accompanying FIGURE where, FIG. 1 is the schematic view of the inventive display device and the standby mode circuit.

The components shown in the FIGURE are numbered as follows:
1. Display device
2. Main microprocessor
3. Standby mode microprocessor
4. Receiver
5. 105, Diode
6. Battery
7. Converter
8. 108, Switch
9. Relay
10. Control circuit
11. Limiting circuit The inventive display device (1) comprises a main microprocessor (2) controlling the circuit and its components, a standby mode microprocessor (3) that controls the power supplies in standby mode, a receiver (4) that receives the infrared (IR) signals sent by the remote control and transmits them to the standby mode microprocessor (3), two diodes (5, 105), a battery (6) used as the power supply in standby mode, a converter (7) by which standby mode voltage (Vstby) is obtained from the battery (6) voltage, a switch (8) used in turning on/off of the receiver (4) supply, a switch (108) used in turning on/off of the standby mode by the user, a relay (9) used in automatic cut off of the mains supply, a control circuit (10) controlling turning on/off of the relay (9) and a limiting circuit (11) which is parallel connected to the switch (8) and which prevents drawing excessive current from the receiver (4) during turning on/off of the receiver (4) (FIG. 1).

The standby mode microprocessor (3) is the microprocessor that controls the functions in the standby mode so as to reduce the power consumption. For this reason, the standby mode microprocessor (3) continues to be supplied with the standby mode voltage (Vstby) at node A when the display device (1) is in standby mode. The standby mode microprocessor (3) enables control of the switch (8) used in turning on/off of the IR receiver (4) supply and control of the control circuit (10) that turns on/off the relay (9) connected to the input (B) of the mains supply (SMPS); and enables evaluation of the command signals coming from the receiver (4) and transfer thereof to the main microprocessor (2) using a special timer. Additionally, it carries out measurement of the battery (6) voltage and control of the converter (7) according to the measured voltage value.

The IR (infrared) receiver (4) is the unit which receives the infrared signals that are sent to the display device (1) by the remote control and that comprise the function commands (e.g. turning on/off, channel switching, etc.), and which transfers these signals to the standby mode microprocessor (3). In order to receive the commands for switching to and exiting standby mode, the IR receiver (4) also continues to operate in standby mode as well as the standby mode microprocessor (3). Therefore, when the receiver (4) is switched to the standby mode, it is supplied with standby mode voltage (Vstby).

The standby mode microprocessor (3) and the receiver (4) are supplied with mains supply voltage (Vsmps) at the B node received via the switch-mode power supply when the display device (1) is turned on, that is, when it is in normal operation mode; when the display device (1) switches to standby mode, they are supplied with the battery voltage (Vbat) at the C node provided by the battery (6). There is one diode (5, 105) connected to each of the two supply inputs (B, D). When the display device (1) is in normal operation mode, the diode (5) connected to the mains supply input (B) allows passage of the current that will supply power to the standby mode microprocessor (3) and the receiver (4). Since in normal operation mode, the mains supply voltage (Vsmps) is higher than the battery voltage, the diode (105) connected to the input of the line by which battery supply is realized blocks connection of the battery (6) with the circuit whereby preventing drawing current from the battery (6).

The battery (6) which is used as the power supply in standby mode, supplies power to the standby mode microprocessor (3) and the receiver (4) in standby mode via a diode (105). Due to depletion of the battery's (6) energy by time, the battery voltage (Vbat) changes by time. For this reason, the battery voltage (Vbat) is not directly used as the standby mode voltage (Vstby). In order to use the battery (6) energy in an efficient way and to prolong the battery (6) life, a DC-DC converter (7) is used between the positive terminal (C node) of the battery (6) and the positive terminal (D node) of the diode (105) connected to the input of the circuits supplied in standby mode. The DC-DC converter (7) controlled by the standby mode microprocessor (3) converts the battery voltage (Vbat) to standby mode voltage (Vstby).

A large part of the power consumed in standby mode is used by the receiver (4). For this reason, the standby mode microprocessor (3) operates the receiver (4) in standby mode by turning it on and off periodically. Turning on/off of the receiver (4) supply is carried out by the standby mode microprocessor (3) turning on/off the switch (8) located between the ground terminal (GND) of the receiver (4) and the ground. The intervals when the receiver (4) will be on and off are adjusted such that they will minimize power consumption but will not allow missing the commands sent via the remote control. For example in a remote control application where RC5 protocol which is commonly used in infrared data communication is taken as basis, the receiver (4) is maintained ON for 0.15 seconds and OFF for 0.85 seconds. The standby mode microprocessor (3) turns the switch (8) on and off at a frequency suitable to these time periods. This way, the time for detecting the commands coming from the remote control does not prolong and the user does not have to depress the key on the remote control more than once or for a long time in order to transmit a command.

The turning on/off operation is carried out at a suitable frequency such that the voltage at the ground terminal of the receiver (4) does not completely drop to zero. For this purpose, a parallel current limiting circuit (11) is used. This way, the automatic gain control (AGC) value in the receiver (4) is maintained and the possibility of the receiver (4) making a mistake in detecting remote control signals is minimized.

When the display device (1) switches from the normal operation mode to standby mode upon the command received from the remote control, the standby mode microprocessor (3) sends a command to the control circuit (10) to turn off the relay (9) and the relay (9) connected to the mains supply input (B) is turned off by the control circuit (10). This way, drawing fault current from the mains supply in standby mode is prevented whereby the power drawn from the mains supply is guaranteed to be zero.

The standby mode microprocessor (3) does not transmit the signals coming from the receiver (4) directly to the frame in standby mode in order to prevent extra energy loss. For this purpose, a special timing is used. When the command of exiting the standby mode is detected, the control circuit (10) turns the relay (9) off and once the frame voltage rises to a certain value, the command signals are transmitted to the frame. As the other commands are not transmitted to the main microprocessor (2), energy is saved.

When the display device (1) operates in standby mode, the battery voltage (Vbat) is measured by the standby mode microprocessor (3) and the changes in this voltage are monitored. When it is determined that battery voltage drops below a certain value, the standby mode microprocessor (3) switches the display device (1) from standby mode to 'active standby' mode, that is, it enables that the supply is provided from the mains supply voltage (Vspms). The battery voltage (Vbat) is measured based on the current drawn from the battery (6). However, the said current having a very low value makes it difficult to measure battery voltage (Vbast) precisely. For example, in the case of drawing small amount of current from LiSOCl2 batteries for a long period of time, the internal resistance of these batteries rises up to high values and faulty results can be obtained when the standby mode microprocessor (3) is measuring the battery voltage (Vbat). In order to prevent this type of measurement faults, the standby mode microprocessor (3), before measuring the battery voltage (Vbat), imitates the current that is formed when the command of exiting the standby mode is received from the receiver (4). For example, the microprocessor (3) completely exits the standby mode and the IR receiver (4) is fully supplied without being switched. Furthermore, current is supplied particularly to certain general purpose input-output ports (GPIO) on the microprocessor (3). This way, detection of the battery as full although it has gone flat and encountering a problem in the next use thereof in standby mode are prevented.

When the battery voltage (Vbat) is determined to fall under a certain level, the standby mode microprocessor (3) produces signals that will warn the user aurally and/or visually and sends these signals to the main microprocessor (2). Presenting these signals to the user by means of the screen and/or speakers, the user is informed that the battery (6) is running low and warned to replace the battery (6).

When the standby mode microprocessor (3) determines that the battery voltage (Vbat) is insufficient, it enables the DC-DC converter (7) to function as the amplifier. This way, battery voltage (Vbat) is amplified and the necessary standby mode voltage (Vstby) is obtained.

If, upon the warning that the battery 6) is running low, the battery (6) is not replaced and the battery voltage (Vbat) runs too low to provide the standby mode supply, the standby mode microprocessor (3) switches the display device (1) to 'active standby' mode where the low energy consumed in standby mode is provided from the mains supply. Thus, even if the battery (6) voltage has dropped too low to be used in standby mode, the display device (1) can continue to operate in standby mode without any problem.

The 'active standby' mode is also used in the case that functions whose power consumption is very high (e.g. timer) are operated in standby mode in the display device (1). When the standby mode microprocessor (3) determines that the current drawn from the battery (6) is above a certain value, it switches the display device (1) to the active standby mode. This way, the battery (6) energy consumed in standby mode is reduced whereby prolonging the battery (6) life.

The inventive display device (1) can operate in standby mode without drawing power from the mains supply thanks to use of battery (6) and thanks to the fact that the standby mode microprocessor (3) operates so as to minimize the power consumption in carrying out the functions in the standby mode. The power consumed in standby mode is minimized in standby mode thanks to the facts that the receiver (4) is periodically supplied with power in the standby mode, the battery voltage (Vbat) is constantly monitored and in the case that it drops under a certain value the gain value of the DC-DC converter (7) is adjusted and it is switched to 'active standby' mode when necessary, it is switched to the 'active standby' mode when the current drawn from the battery (6) is determined to be above a certain value and in the battery-supplied standby mode the relay (9) is turned on whereby mains supply connection is cut off. Thus, the standby mode circuit that is used operates such that it varies according to both the battery voltage (Vbat) and the current drawn from the battery (6), and this way the greatest possible energy saving is achieved in standby mode.

Within the framework of this basic concept, it is possible to develop a wide variety of applications of the display device (1). The invention is essentially according to the claims and can not be limited to the examples provided herein.

The invention claimed is:

1. A display device, which is operational in normal operation mode, and in standby mode and active standby mode, wherein it consumes low energy, the display device comprising
    a main microprocessor controlling a circuit and its elements, a standby mode microprocessor, a receiver that receives infrared (IR) signals sent by a remote control and transmits them to the standby mode microprocessor, a battery used as a power supply in standby mode, a DC-DC converter by which standby mode voltage (Vstby) is obtained from the battery voltage (Vbat); characterized by
    the standby mode microprocessor which, in standby mode, constantly measures a value of the battery voltage (Vbat) and a value of current drawn from the battery, and according to changes in these values, carries out control of supply to the receiver and an adjustment of a gain value of the DC-DC converter.

2. A display device according to claim 1, wherein the receiver is an IR receiver which is supplied by standby mode voltage (Vstby) in standby mode in order to receive a plurality of commands for switching to and exiting standby mode.

3. A display device according to claim 1, characterized by a diode having a positive terminal connected to a mains supply input (B) and a negative terminal connected to a node (A) from which the standby mode microprocessor and the receiver are supplied, and which allows a current coming from the mains supply to pass only in an A direction.

4. A display device according to claim 1, characterized by a diode having a positive terminal connected to an output (D) of the converter and a negative terminal connected to a node (A) from which the standby mode microprocessor and the receiver are supplied, and which allows a current coming from the converter to pass only in an A direction in standby mode; and in normal operation and active standby modes hinders connection of the battery with the circuit whereby preventing drawing current from the battery.

5. A display device according to claim 1, characterized by a switch which is located between the ground terminal (GND) of the receiver and the ground and turned on/off by the standby mode microprocessor, and the receiver which is periodically supplied with power such that in standby mode a time period it is turned off is longer than a time period it is turned on.

6. A display device according to claim 5, characterized by the receiver which is supplied by being turned on/off at a suitable frequency such that a voltage at the ground terminal thereof does not completely drop to zero.

7. A display device according to claim 6, characterized by a current limiting circuit which is parallel connected to the switch and which, during periodic turning on/off of the receiver, prevents the voltage at the ground terminal of the receiver from completely dropping to zero.

8. A display device according to claim 1, characterized by a relay which is used to automatically cut off a mains supply when a command for exiting the normal operation mode and switching to standby mode is received, a control circuit which controls turning on/off of the relay and the standby mode microprocessor which sends a signal to the control circuit to turn on the relay.

9. A display device according to claim 8, characterized by the control circuit which, upon receiving a command from the standby mode microprocessor, turns on the relay that is connected to an input of the mains supply, whereby prevents drawing fault currents from the mains supply in the standby mode.

10. A display device according to claim 8, characterized by the standby mode microprocessor which, upon receiving a command for exiting the standby mode and switching to normal operation mode, sends the control circuit a command for turning on the relay.

11. A display device according to claim 9, characterized by the standby mode microprocessor which, upon receiving a command for exiting the standby mode and switching to normal operation mode, sends the control circuit a command for turning on the relay.

12. A display device according to claim 10, characterized by the standby mode microprocessor which transmits a plurality of command signals to a frame after the control circuit turns the relay off and the frame voltage rises to a certain value.

13. A display device according to claim 11, characterized by the standby mode microprocessor which transmits a plurality of command signals to a frame after the control circuit turns the relay off and the frame voltage rises to a certain value.

14. A display device according to claim 1, characterized by the standby mode microprocessor which, when it determines that the battery voltage (Vbat) is below a certain level, produces signals that will warn a user aurally and/or visually, and which enables the user to be informed that the battery is running low and to be warned to replace the battery via a screen and/or speakers.

15. A display device according to claim 1, characterized by the standby mode microprocessor which, when it determines that the battery voltage (Vbat) is below a certain level, enables the DC-DC converter to function as an amplifier, whereby it amplifies the battery voltage (Vbat) and enables a necessary standby mode voltage (Vstby) is obtained.

16. A display device according to claim 1, characterized by the standby mode microprocessor which enables switching to the active standby mode when it determines that the battery voltage (Vbat), although amplified by the converter, has run too low to provide a sufficient standby mode voltage (Vstby).

17. A display device according to claim 1, characterized by the standby mode microprocessor which, when it determines that the current drawn from the battery is above a certain value, enables switching to the active standby mode.

* * * * *